United States Patent [19]

Haikawa et al.

[11] Patent Number: 5,136,394
[45] Date of Patent: Aug. 4, 1992

[54] PICTURE SEARCH SYSTEM FOR DIGITAL RECORDING/REPRODUCING APPARATUS

[75] Inventors: Yukihiko Haikawa; Yoshihiro Okamoto, both of Higashi-hiroshima, Japan

[73] Assignee: Sharp Kabushiki Kaisha, Osaka, Japan

[21] Appl. No.: 539,543

[22] Filed: Jun. 18, 1990

[30] Foreign Application Priority Data

Jun. 19, 1989 [JP] Japan .................................. 1-157890

[51] Int. Cl.$^5$ .............................................. H04N 5/78
[52] U.S. Cl. .................... 355/335; 355/312; 360/10.1; 360/33.1
[58] Field of Search ............... 358/335, 312; 360/10.1, 360/11.1, 33.1, 35.1

[56] References Cited

U.S. PATENT DOCUMENTS

| 4,575,772 | 3/1986 | Shimada et al. | 360/19.1 |
| 4,587,573 | 5/1986 | Odaka | 360/10.3 |
| 4,751,589 | 6/1988 | Kominami et al. | 360/10.3 |
| 4,763,208 | 8/1988 | Kawamura et al. | 360/10.1 |

FOREIGN PATENT DOCUMENTS 3146964 11/1981 Fed. Rep. of Germany .

OTHER PUBLICATIONS

Alan V. Oppenheim article "Signals and Systems", 1983, pp. 513 to 555.
SMPTE Journal Yasuhiro Hirano, "A Study on Variable-Speed Reproduction of the Digital VTR", Jun. 1983, pp. 636–641.
Digitale Bildaufzeichnung, Charles E. Anderson, 1970, No. 4, pp. 119–123.

Primary Examiner—Roy N. Envall, Jr.
Assistant Examiner—Huy Nguyen
Attorney, Agent, or Firm—Birch, Stewart, Kolasch & Birch

[57] ABSTRACT

In digital recording/reproducing apparatus of the invention, picture signals are digitalized, digital data for picture elements constructing each picture is stored together in a memory, and digital data is read out from the memory and recorded on a recording medium in a predetermined order. The memory includes plural memory regions for successively storing digital data corresponding to a predetermined number of picture elements in direction of horizontal scan of a picture. Data for every memory region is stored on the recording medium and thus memory regions are set on the recording medium corresponding the memory regions of the memory. In normal reproducing, all data is read out and is displayed. In search, only data stored in a memory region previously selected out of the plural memory regions is read out and displayed. Since only part of data constructing a picture is read out and displayed, time for read-out of data is shortened and thus a search is completed in a short while.

20 Claims, 4 Drawing Sheets

PICTURE SEARCH SYSTEM FOR DIGITAL RECORDING/REPRODUCING APPARATUS

BACKGROUND OF THE INVENTION

1. Field of the Invention

The present invention relates to digital recording/reproducing apparatus for recording digital data converted from picture signals on a recording medium like a magnetic tape and for reading out the digital data from the medium to a display.

2. Description of the Prior Art

Picture signals for one frame or two fields generally construct a picture. In prior art recording/reproducing apparatus, picture signals input for two fields are sampled at a certain sampling frequency, are converted to digital data, which is recorded on a recording medium like a magnetic tape in order of sampling. The digital data recorded is successively read out from the magnetic tape and is reproduced on a display like a CRT (cathode-ray tube).

In the prior art recording/reproducing apparatus for picture signals, when a specified picture plane is searched, all picture data each constructing a picture plane or all picture data for two fields is successively read out and is shown on a display. The prior art apparatus thus requires some time for the search.

SUMMARY OF THE INVENTION

A principal object of the invention is to provide digital recording/reproducing apparatus in which digital data, e.g., picture signals, recorded on a recording medium like a magnetic tape is rapidly searched.

The above and other related objects are realized by digital recording/reproducing apparatus for recording and reading out digital data on and from a recording medium, in which digital data for each unit previously designated is recorded together; for reproducing, all digital data is read out and is reproduced; and for search, digital data for a predetermined unit out of the all units or even for part of the predetermined unit is selectively read out.

In the digital recording/reproducing apparatus according to the invention, when a specified data is searched, only a predetermined one of the units or even part of the unit is selectively read out and is reproduced.

Each unit consists of, e.g., digitalized data of eight bits showing gradation of picture elements of picture signals. Part of the unit designates, for example, only upper four bits of the digitalized data. The partial read out, e.g., reading out only upper 4 bits, makes the gradation rough but is sufficient to check what picture is recorded.

The predetermined unit may consist of picture signals for just one field out of a frame constructing a picture plane or may be those for only the upper half or even a quarter of one field. Displaying only part of a picture plane is sufficient to check what picture is recorded on the recording medium.

The digital recording/reproducing apparatus of the invention makes a rapid search possible and thus has greatly improved usability.

Features of the invention include digital recording/reproducing apparatus in which digital data for each group of picture elements is stored together on a recording medium; and in normal reproducing, all digital data is successively read out and is displayed. The digital recording/reproducing apparatus includes reading means for reading out only digital data corresponding to a predetermined group of picture elements out of all digital data stored on the recording medium and displaying means for displaying output from the reading means.

The recording medium of the apparatus includes plural regions for successively storing digital data corresponding to a predetermined number of picture elements in a direction of horizontal scan of a picture and for eventually storing all digital data required for reconstruction of the picture. The reading means reads out digital data stored in a memory region previously selected out of the plural memory regions.

The digital data consists of plural bits and the reading means reads out a bit or bits previously selected out of the plural bits.

The digital data shows gradation of picture elements.

In the digital recording/reproducing apparatus of the invention, digitalized picture data for a group of picture elements is stored together on a recording medium. In normal reproducing, all the picture data is read out and is displayed. In search, only the picture data corresponding to a predetermined group of picture elements out of all the picture data stored on the recording medium is read out and displayed. Since only a part of picture elements constructing a picture are read out and displayed, time for read-out of data is shortened and thus a search is completed in a short time.

The picture data consists of plural bits for showing gradation. In search, only a predetermined bit out of the plural bits is read out and is displayed. Though gradation of the picture reproduced is rough, it is sufficient to recognize what picture is recorded. The partial reproduction also shortens time for read-out of data and saves time for search.

BRIEF DESCRIPTION OF THE DRAWINGS

Other and further objects, features, and advantages of the invention will be more explicit from the following detailed description taken with reference to the drawings wherein.

DESCRIPTION OF THE PREFERRED EMBODIMENTS

Figure 1:
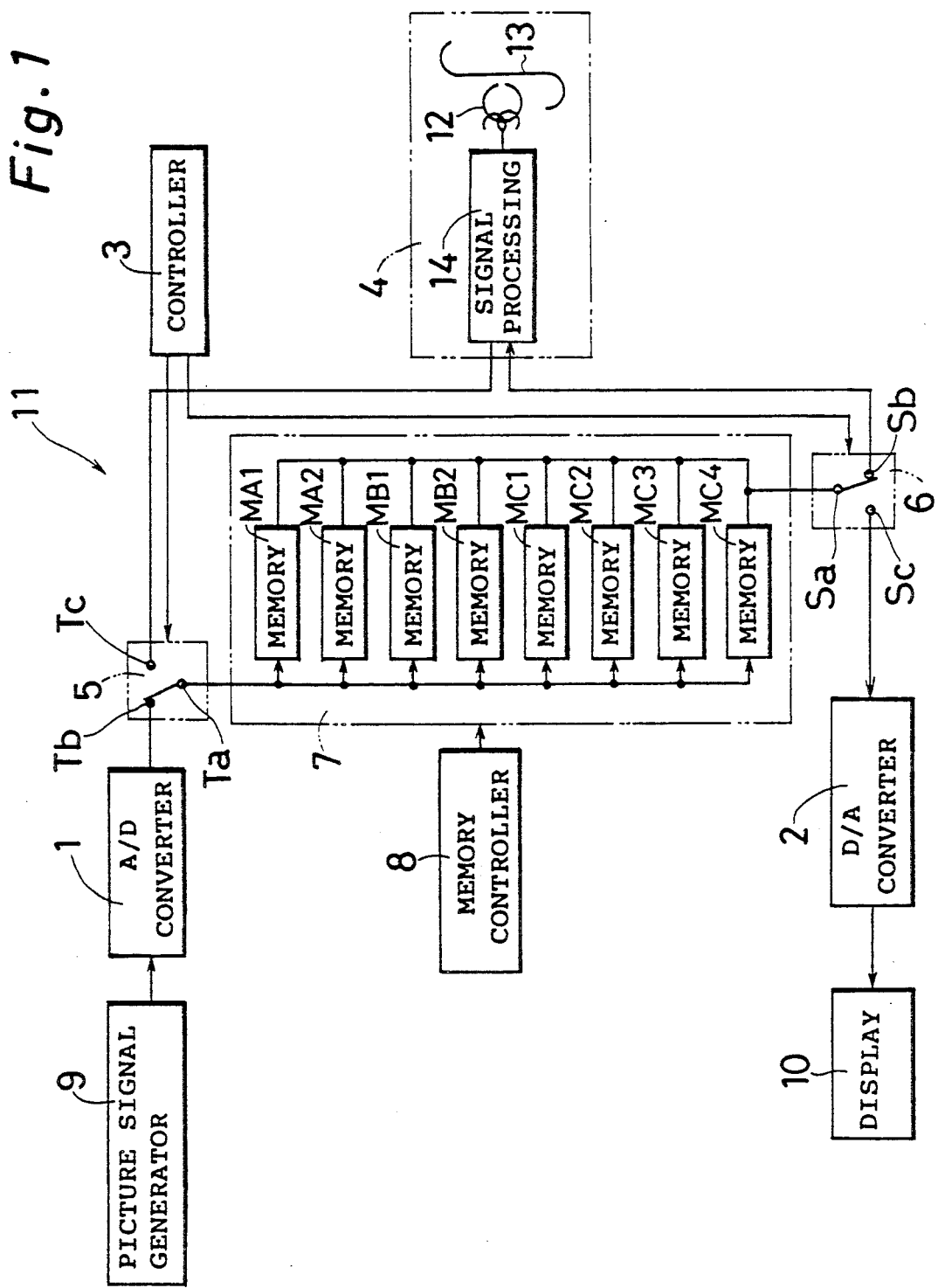
FIG. 1 is a block diagram showing a basic structure of digital recording/reproducing apparatus of an embodiment according to the invention.

Now referring to the drawings, a preferred embodiment of the invention is described below.

FIG. 1 is a block diagram showing a basic structure of digital recording/reproducing apparatus 11 of an embodiment according to the invention. The digital recording/reproducing apparatus 11 includes an analog/digital converter (hereinafter referred to as an A/D converter) 1, a digital/analog converter (hereinafter referred to as a D/A converter) 2, a controller 3, a recording/reproducing system 4, change-over switches 5 and 6, plural memories 7, a memory controller 8, a picture signal generator 9 and a display 10.

In recording, analog picture signals from the picture signal generator 9 are digitalized by the A/D converter 1 and are sent to the memories 7 through the change-over switch 5. Here in the change-over switch 5, a terminal Ta is connected to a terminal Tb. The controller 3 changes the connection of the change-over switches 5 and 6. The memory controller 8 determines in which memory out of the plural memories 7 each input data is to be stored. When data for a picture plane is stored in the memories 7, the memory controller 8 outputs the data through the change-over switch 6 to the recording/reproducing system 4. Here in the change-over switch 6, a terminal Sa is connected to a terminal Sb.

The recording/reproducing system 4 has a structure similar to that of a magnetic recording apparatus like a digital audio tape recorder and includes a signal processing circuit 14, a magnetic head 12 and a magnetic tape 13. The signal processing circuit 14 adds an error correcting code or a parity check code to data and then modulates the data, which is then recorded on the magnetic tape 13 through the magnetic head 12.

In reproducing, data read out from the magnetic tape 13 through the magnetic head 12 is error-corrected and demodulated at the signal processing circuit 14 and is stored in the memories 7 through the change-over switch 5. Here in the change-over switch 5, the terminal Ta is connected to a terminal Tc. The memory controller 8 reads out required data from the memories 7 as described below and sends the data through the change-over switch 6 to the D/A converter 2. Here in the change-over switch 6, the terminal Sa is connected to a terminal Sc. The digital data is then converted to analog data at the D/A converter 2 and is displayed on the display 10 like a CRT (cathode-ray tube).

Figure 2:
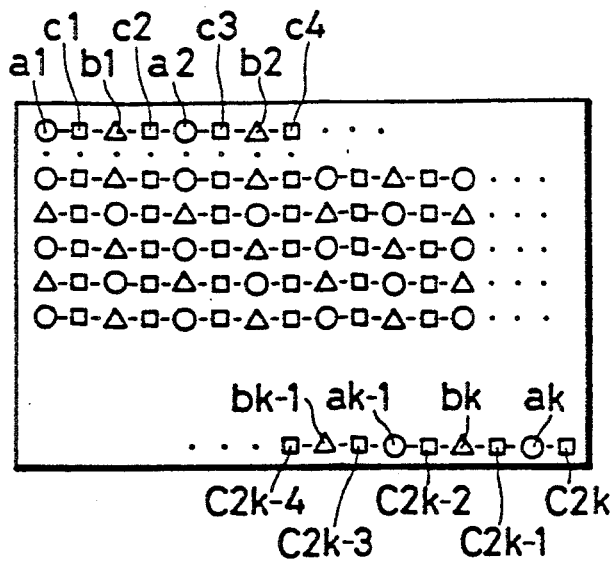
FIG. 2 is a diagram showing an arrangement of picture elements recorded.

FIG. 2 is a diagram showing an arrangement of sampling points or picture elements of a picture displayed on a screen 16 of the display 10. The symbols 'o', 'Δ', '□', respectively designate picture elements. Hereinafter 'o' is represented by ai (i=1 to k), 'Δ' is by bi (i=1 to k) and '□' is by ci (c=1 to 2k). The picture elements are sampled along a horizontal scanning direction; The order is a1, c1, b1, c2, a2, c3, b2, c4, ...... c2k-4, bk-1, c2k-3, ak-1, c2k-2, bk, c2k-1, ak, c2k. Picture data for each picture element sampled is converted to digital data showing gradation of m+n bits; e.g., 4+4 bits = 8 bits. The gradation may be of lightness or color. Stated another way, gradation is an 8 bit digital value of either the brightness or color of the picture element. Picture data dai for the picture elements ai consists of the upper m bit-data daim and the lower n bit-data dain. Picture data dbi for the picture elements bi consists of data dbim and data dbin, and picture data dci for the picture elements ci consists of data dcim and data dcin in the same manner.

Figure 3:
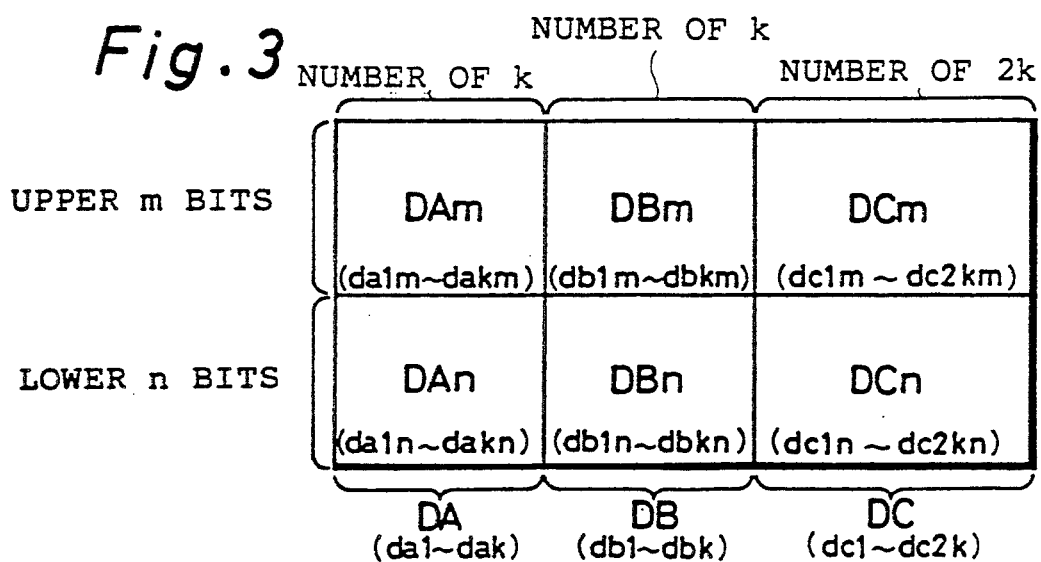
FIG. 3 is a diagram showing a construction of data for a picture plane.

FIG. 3 is a diagram showing a construction of digital data for one picture plane. The number of picture elements A is k, and picture data DA consists of data DAm and data DAn. The number of picture elements B is also k, and picture data DB consists of data DBm and data DBn. The number of picture elements C is 2k and picture data DC consists of data DCm and data DCn.

Figure 4:
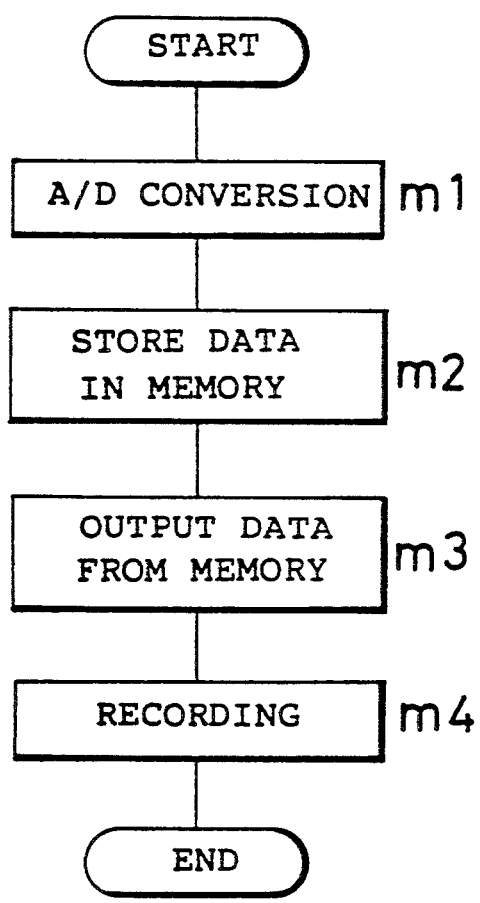
FIG. 4 is a flow chart showing processes for recording data.

FIG. 4 is a flow chart showing processes for recording data. At step m1, picture signals (in this embodiment, picture signals for one field) output from the picture signal generator 9 are converted to digital data of m+n bits by the A/D converter 1 in the order of picture elements shown in FIG. 2 (i.e., a1, c1, b1 .....). The A/D converter 1 divides the digital data between data of m bits and data of n bits to successively output them into the memories 7. This can be implemented, for example, by an A/D converter which includes time delay means, not shown, and which operates to output m undelayed bits followed by n delayed bits. Alternatively, this function could be carried out by the memory controller 8. Picture data da1 for the picture element a1 is divided between data of da1m and data of da1n to be output into the memories 7. Picture data db1 and dc1 respectively for the picture elements b1 and c1 are processed in the same manner as the picture data da1. In the memories 7, data is thus stored in the order of da1m, da1n, dc1m, dc1n, db1m, db1n......

At step m2, the memory controller 8 determines in which memory out of the plural memories 7 data for each picture element sent in the above order is to be stored. For example, data da1m and da1n are respectively stored in a memory MA1 and a memory MA2, data dc1m, dc1n in memories MC1 and MC3 and data db1m and db1n in memories MB1 and MB2. Data DAm is stored in the memory MA1, data DAn in the memory MA2, data DBm in the memory MB1, data DBn in the memory MB2, data DCm in the memories MC1 or MC2 and data DCn in the memories MC3 or MC4.

Figure 5:
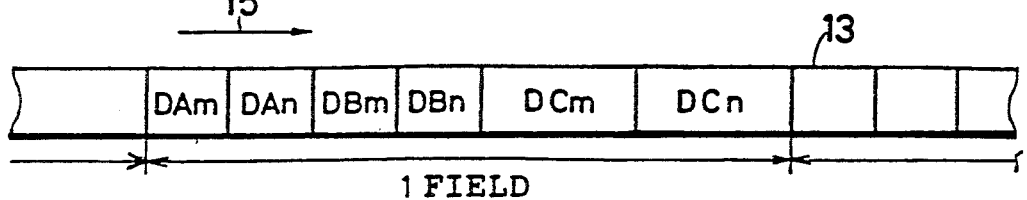
FIG. 5 is a diagram showing an arrangement of data recorded on the magnetic tape 13 of FIG. 1.

When all picture data for one picture plane are stored in the memories 7 in the above manner, the program proceeds to step m3 at which the memory controller 8 outputs data at a speed corresponding to a recording speed of the recording/reproducing system 4. Here data is read out from the memories 7 in the order of MA1, MA2, MB1, MB2, MC1, MC2, MC3 and MC4 and is sent to the recording/reproducing system 4 in the order of DAm, DAn, DBm, DBn, DCm and DCn. At step m4, data is recorded on the magnetic tape 13 of the recording/reproducing system 4 in the above order as shown in FIG. 5. An arrow 15 shows the moving direction of the magnetic head 12 in recording and reproducing.

Figure 6:
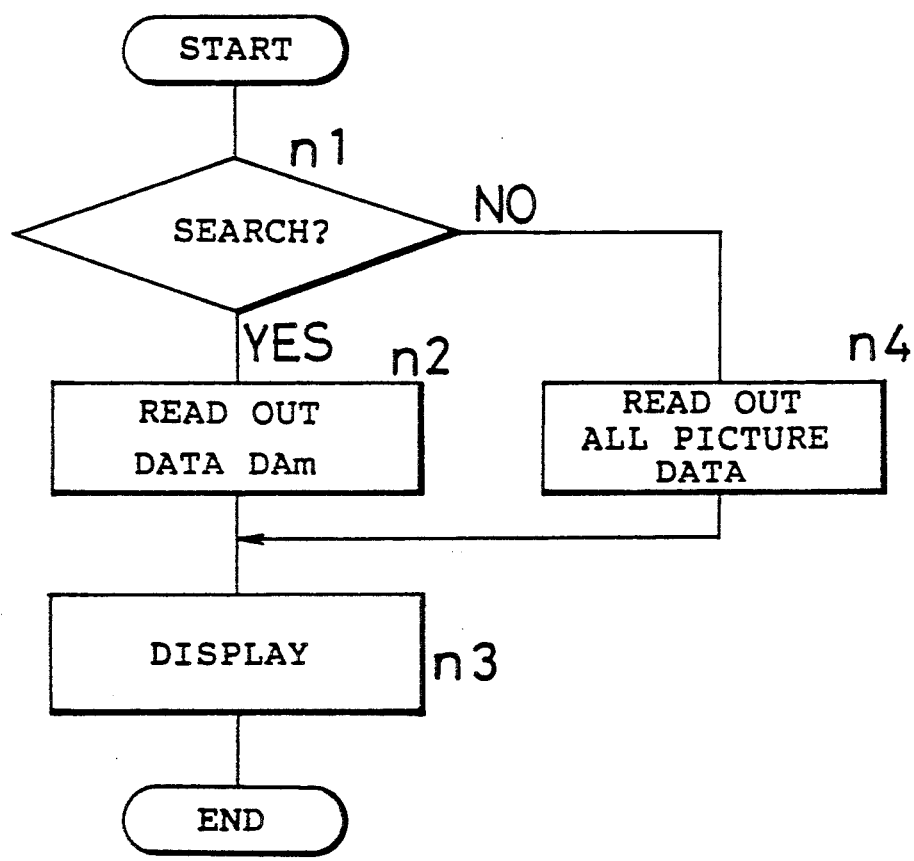
FIG. 6 is a flow chart showing processes for reproducing data.

FIG. 6 is a flow chart showing processes for reproducing data. At step n1, it is determined if reproducing is performed for a search. The search mode is implemented by the recording/reproducing system 4, the controller 3, and the memory controller 8. In the case of a search, the program proceeds to step n2 and in the case of a normal playback, it proceeds to step n4. At step n2, for example, data DAm for one picture plane is read out from the recording/reproducing system 4 and is stored in and read out of the memory MA1 of the memories 7. At step n3, data DAm is transmitted to the D/A converter 2 at a transmission rate as picture data, is converted to analog picture signals to be displayed on the display 10. Here picture data displayed is only for the picture elements ai (picture elements shown by the symbol 'o' in FIG. 2) and also only of the upper m bits. The picture shown on the display 10 thus has low resolution, rough gradation and low picture quality but is sufficient just to check what picture is recorded. The system 4 then moves the magnetic tape 13 to the beginning position of the next picture data and the process repeats itself.

At step n4, all picture data, i.e., data DAm, DAn, DBm, DBn, DCm and DCn, are consecutively read out from the magnetic tape 13 of the recording/reproducing system 4 and are output to the memories 7. The memory controller 8 stores data in the memories MA1, MA2, MB1, MB2, MC1, MC2, MC3 and MC4 in the same manner as in recording. At step n3, picture data is sent to the D/A converter 2 in the same order as in recording, i.e., in the order of the picture elements shown in FIG. 2. The picture data is converted to analog picture signals by the D/A converter 2 and displayed on the display 10.

According to the embodiment, in search, only required data, e.g., DAm, out of all picture data is read out and reproduced. The time required for reproduction of one picture plane comprised of BAm is thus shorter than that for normal reproduction time of all picture data; the time of reproduction of BAm is thus $m/4(m+n)$ the normal reproduction time, i.e. $T \times m/4(m+n)$ where T is the time required to read out and reproduce all the picture data included in DAm, DAn ... DCn. The embodiment realizes a quick search.

Data read out may be DBm or DCm or one of picture data DA, DB or DC. The recording medium is not limited to the magnetic tape 13 but may be a magnetic recording disc an optical disc or any other recording medium.

Picture signals recorded may be for two fields. Data read out for search may be data corresponding to the upper half or a quarter of one picture plane.

Recording only selected data for one picture plane corresponding to the picture quality required for reproducing saves the recording medium and time for reproduction.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A method of recording/reproducing the picture output of an electronic picture signal generator, comprising the steps of:
    sampling the output of said picture signal generator in a predetermined scan direction and providing a plurality of analog picture elements corresponding to at least one field of a picture frame;
    converting each analog picture element into a multibit digital data signal;
    feeding each digital data signal into a selected memory of a plurality of digital memories in a predetermined sequence to define three sets of digital data further divided into respective pairs of subsets including upper and lower numbered bits of said data signal;
    serially reading out and recording all of the bits of said subsets into respective regions of a recording medium in said predetermined sequence; and
    during a search mode, reading a selected subset of digital data signals recorded on the recorded medium;
    converting said digital data signals of said subset into analog signals; and
    generating a visual display of said analog signals so as to provide a picture of a predetermined reduced quality to determine which specific picture is recorded in said respective regions of the recording medium.

2. The method of claim 1 and additionally including the step of feeding said selected subset back through one of said digital memories prior to said converting step.

3. The method of claim 2 wherein said selected subset comprises the first subset of said first set of digital data bits and wherein said one memory comprises the first of said plurality of digital memories.

4. The method of claim 3 wherein said selected subset comprises one half of the digital data bits of every fifth picture element.

5. The method of claim 4 wherein said one half of the digital data bits comprises the first half of said first set of digital data signals.

6. The method of claim 3 wherein the second subset of said first set comprises the other half of said digital data signals of every fifth picture element.

7. The method of claim 3 wherein the second set of said three sets of digital data comprises every third picture element.

8. The method of claim 3 wherein the third set of said three sets of digital data comprises every other picture element.

9. The method of claim 1 wherein the first set of said three sets of digital data comprises every fifth picture element of a horizontal scan line of picture elements, the second set of said three sets comprises every third picture element of said line, and said third set of said three sets comprises every other picture element of said line.

10. The method of claim 1 and during a normal play mode additionally including the steps of:
    reading all of the recorded subsets from said recording medium;
    feeding all said subsets back into said memories in the same sequence as recorded;
    thereafter serially feeding the digital data signals of all said subsets out of said memories in said same sequence;
    converting said digital data signals into analog picture signals; and
    generating a visual display of said picture signals.

11. Apparatus for recording/reproducing the picture output of a picture signal generator, comprising:
    an electronic picture signal generator generating analog picture signals in a predetermined scan direction and providing a plurality of analog picture elements corresponding to at least one field of each picture frame;
    means for converting each analog picture element into a multibit digital data signal;
    a plurality of digital memories;
    a recording medium;
    control means for, (a) feeding each digital data signal into a selected memory of said plurality of digital memories in a predetermined sequence to define three sets of digital data further divided into respective pairs of subsets including upper and lower numbered bits of said data signal, (b) serially reading out and recording all of the bits of said subsets into respective regions of said recording medium in said predetermined sequence, and (c) reading a selected subset recorded on the recorded medium during a search mode;
    means for converting said digital data signals of said subset into analog signals; and
    means for generating a visual display of said analog signals so as to provide a picture of a predetermined reduced quality to determine which specific picture is recorded in said respective regions of the recording medium.

12. The apparatus of claim 11 and additionally including means for feeding said selected subset back through one of said plurality of digital memories prior to said converting step.

13. The apparatus of claim 12 wherein said selected subset comprises the first subset of said first set of digital data bits and wherein said one memory comprises the first of said plurality of digital memories.

14. The apparatus of claim 13 wherein said selected subset comprises one half of the digital data bits of every fifth picture element.

15. The apparatus of claim 14 wherein said one half of the digital data bits comprises the first half of said first set of digital data signals.

16. The apparatus of claim 13 wherein the second subset of said first set comprises the other half of said digital data signals of every fifth picture element.

17. The apparatus of claim 13 wherein the second set of said three sets of digital data comprises every third picture element.

18. The apparatus of claim 13 wherein the third set of said three sets of digital data comprises every other picture element.

19. The apparatus of claim 11 wherein the first set of said three sets of digital data comprises every fifth picture element of a horizontal scan line of picture elements, the second set of said three sets comprises every third picture element of said line, and said third set of said three sets comprises every other picture element of said line.

20. The apparatus of claim 11 wherein during a normal play mode said control means, (a) reads all of the recorded subsets from said recording medium, (b) feeds all said subsets back into said memories in the same sequence as recorded; and thereafter (c) serially feeds the digital data signals of all said subsets out of said memories in said same sequence;

wherein said converting means converts said digital data signals into analog picture signals; and said means for generating a visual display generates a complete picture of all said picture elements.

* * * * *